Dec. 31, 1940.　　　W. SHELDON　　　2,226,947
WELL DRILLING APPARATUS
Filed Dec. 31, 1938　　　7 Sheets-Sheet 1

INVENTOR
WALDO SHELDON
BY Philip S. McGran
ATTORNEY Dec. 31, 1940.    W. SHELDON    2,226,947
WELL DRILLING APPARATUS
Filed Dec. 31, 1938    7 Sheets-Sheet 2

INVENTOR
WALDO SHELDON
BY
ATTORNEY

Dec. 31, 1940.  W. SHELDON  2,226,947
WELL DRILLING APPARATUS
Filed Dec. 31, 1938   7 Sheets-Sheet 3

INVENTOR
WALDO SHELDON
BY
ATTORNEY

INVENTOR
WALDO SHELDON

Dec. 31, 1940.    W. SHELDON    2,226,947
WELL DRILLING APPARATUS
Filed Dec. 31, 1938    7 Sheets-Sheet 7

INVENTOR
WALDO SHELDON
BY
ATTORNEY

Patented Dec. 31, 1940

2,226,947

UNITED STATES PATENT OFFICE 2,226,947

WELL DRILLING APPARATUS

Waldo Sheldon, South Norwalk, Conn.

Application December 31, 1938, Serial No. 248,748

6 Claims. (Cl. 214—1)

The present invention relates to the drilling of wells, particularly deep oil wells.

Under present methods and with the equipment at hand, considerable time is expended, and lost, so far as useful work is concerned, by the necessity, on going into the hole, of hoisting the empty traveling block to pick up a fresh stand of pipe and in the case of coming out of the hole, lowering the empty block to again pick up the string in the well. Aside from the loss of time and energy in going through these "idle" return movements, practically all parts of the equipment and particularly the cables are subjected to considerable wear and tear, not contributing to any useful work.

Special objects of this invention are to eliminate and avoid the losses mentioned and to provide a practical and efficient method and means by which necessary operations such as referred to can be carried on more speedily and in a more nearly continuous manner.

The foregoing and other desirable objects are attained in this invention by novel method and equipment, all as hereinafter set forth, illustrated in the accompanying drawings and broadly covered in the claims.

The drawings illustrate various embodiments of the invention. Structure and mode of use however, may be modified and changed as regards the present disclosure, all within the true intent and broad scope of the invention as hereinafter defined and broadly covered in the claims.

Figure 1:
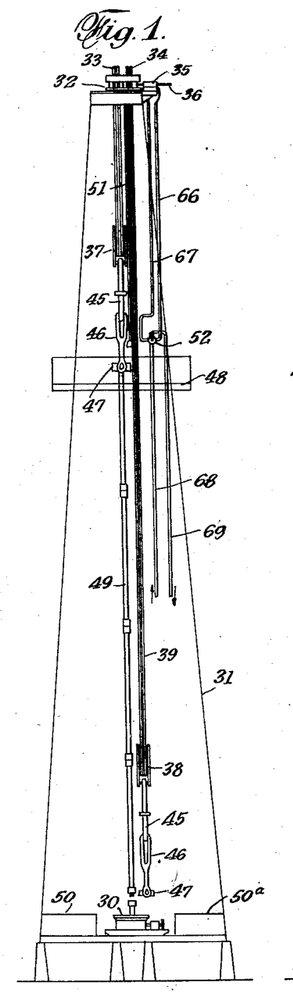
Fig. 1 is a diagrammatic front view of a derrick illustrating the feature of this invention, of having two traveling blocks, and alternately returning one to position for use while the other is in actual service.

In Fig. 1, a rotary of conventional design is indicated at 30, and a derrick at 31.

On the water table of the derrick, a carriage 32, is slidably mounted carrying crown blocks 33 and 34, in closely associated side-by-side relationship.

Shifting of the carriage is effected to center one or the other of the crown blocks over the well by means of a hydraulic or other power cylinder 35, having a piston connected with the carriage by a rod 36.

Associated with the respective crown blocks are the traveling blocks 37, 38, suspended by cable 39, arranged so that with travel in one direction, one block will go up and the other one down, while with cable movement in the reverse direction, the first traveling block will go down and the second block will go up.

Figures 2, 3:
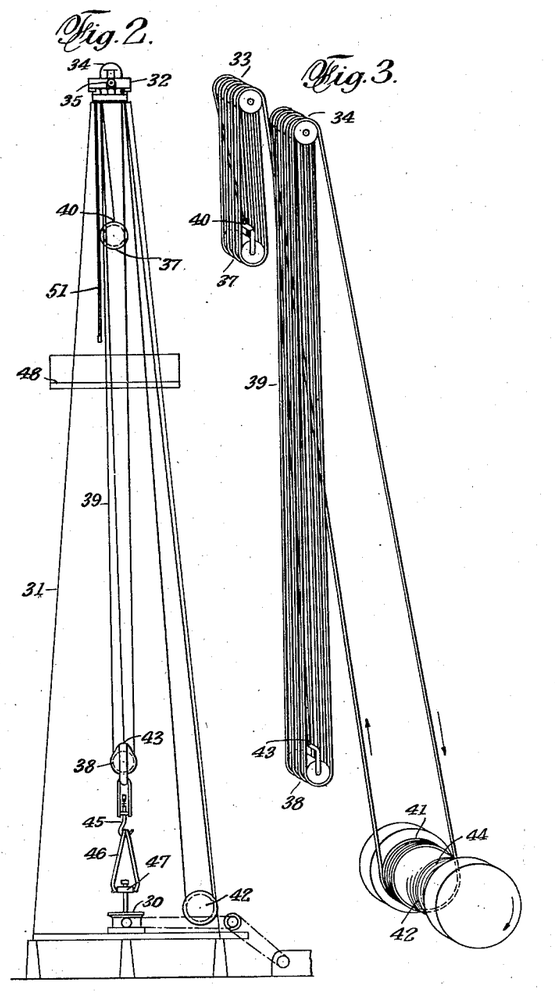
Fig. 2 is a diagrammatic side view showing the second block in hoisting action and the first block returning to the derrick floor.
Fig. 3 is a reeving diagram.
Figure 4:
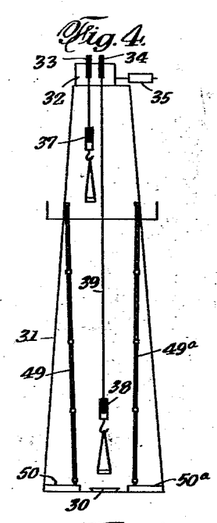
Figs. 4 to 9 inclusive are diagrammatic views illustrating successive steps in going into the hole.
Figure 5:
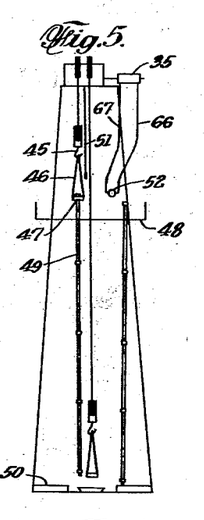
Figure 6:
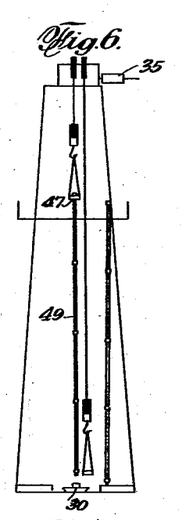
Figure 7:
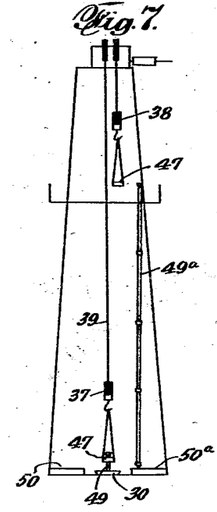
Figure 8:
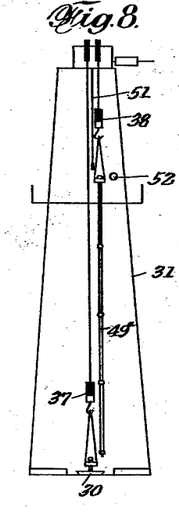
Figure 9:
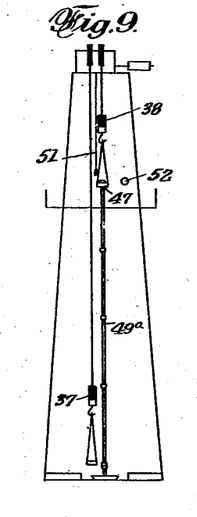

One simple method of reeving to effect such results is indicated in Fig. 3, which shows a single length of cable, connected at one end at 40, with one block 37, and passing around the sheaves of crown block 33, and the sheaves of traveling block 37, thence downward and several turns or wraps 41, about the draw works drum 42 and thence upwardly and around the sheaves of the other crown block 34, and traveling block 38, with this end of the cable secured to the latter traveling block at 43. The drum 42, is shown as of relatively large diameter to provide ample holding friction with a relatively few wraps of cable and is further shown as grooved at 44, to receive and guide the holding turns of cable smoothly from end-to-end of the drum. It will be evident from the diagram, Fig. 3, that with rotation of the drum in the direction of the arrow, the lengths of cable extending upward from opposite sides of the drum to the two crown blocks will travel in opposite directions, thus to lift the one traveling block 38, while lowering the other 37, and that reverse effects will result from rotation of the drum in the opposite direction.

The two traveling blocks are shown as provided with the usual spring hooks 45, links 46 and elevators 47.

With this special equipment and arrangement, the operation of going into the hole may be carried out as indicated in Figs. 4 to 9. In the first of these views, the crown block carriage is over at the left, with the first crown block 33, suspending the first traveling block 37, at the top and in position for a tower man on the catwalk or forble board 48, to latch the elevator of that block to a stand of pipe 49, resting on the platform 50, at the left of the rotary 30. After the pipe is latched by the tower man, the driller raises the stand as in Fig. 5, preparatory to swinging it over the well. The tower man then pulls the cord 51, to unlock the crown block carriage and operates control valve 52, to cause the piston and hydraulic cylinder 35, to shift the crown block assembly to the right to bring the stand over the hole as in Fig. 6. Then with the No. 1 crown block locked in position over the well, the driller releases his brake to lower the pipe suspended from the first traveling block 37, and to raise the second traveling block 38, as in Fig. 7. The floor crew can then insert slips to support the pipe in the rotary and unlatch the elevator and at this time, the tower man can be latching or getting ready to latch the elevator of the second traveling block onto the stand of pipe 49a, racked on the right hand platform 50a. When this is accomplished, the driller raises the stand as in Fig. 8, the tower man unlocks the crown block carriage by pulling cord 51, and operates control valve 52, to shift the crown block assembly to the left and thus carry the second stand over the well, whereupon after coupling to the first stand as in Fig. 9, the string may be lowered and the first traveling block 37, be raised back up to the Fig. 4 position, ready to take the next stand at the left.

In this manner, the hook which has been relieved of its load, is shifted over toward one rack and then returned to position ready for taking a stand from that rack, while the loaded hook is lowering the preceding stand into the well and by such shifting in opposite directions, each hook takes from that rack which is nearest to it and has the shortest movement to carry the stand over the well center. No time is lost for returning the empty hook, as heretofore and the parts are not subjected to the useless wear of any such operations.

Figure 10:
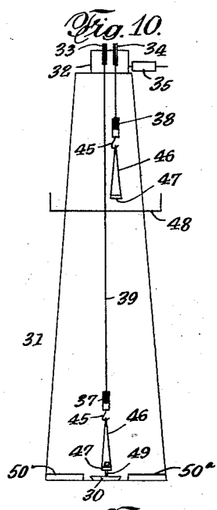
Figs. 10 to 15 are similar views illustrating steps in coming out of the hole.
Figures 11, 12, 14, 15, 16:
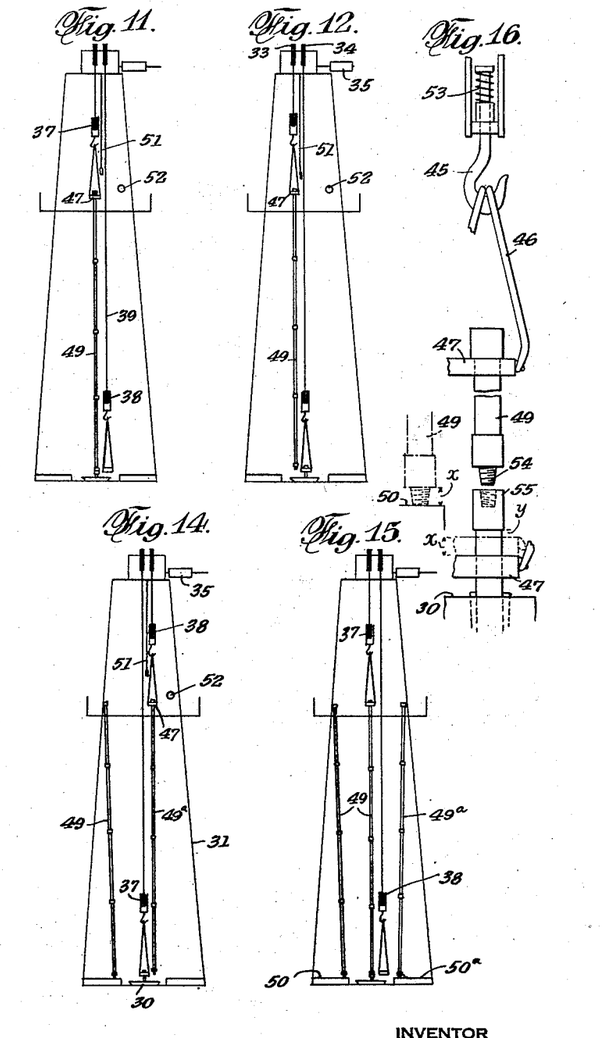
Fig. 16 is a broken detail illustrating the automatic lift of the stand when uncoupled from the string.
Figure 13:
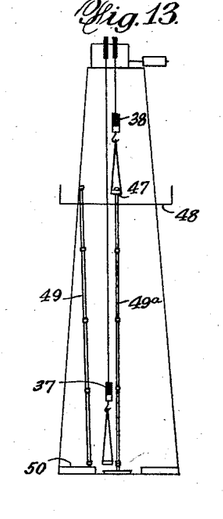

For coming out of the hole, the operations described are reversed. Thus as shown in Fig. 10, after attachment of the No. 1 traveling block 37, the pipe is raised and the No. 2 block 38 is lowered as in Fig. 11. Then after the pipe is lowered in the slips inserted for holding it in the rotary, the pipe is broken at the tool joint. As the weight of the string comes off the hook on the unscrewing of this joint, the spring 53 of the hook expands as indicated in Fig. 16, to lift the top stand 49, sufficiently for the tool joint pin 54, to clear the box 55, so that the free stand is clear to be swung over the platform. The tower man can then pull the lock cord 51, to release the crown block carriage and operate control valve 52, to shift the crown block assembly over to the left as in Fig. 12. The driller may then release the brake to drop the stand 49 on the left platform 50. This lowering movement, indicated at x, Fig. 16, is accompanied by a corresponding lifting movement at the other traveling block as indicated at xa, but the pipe is supported by the slips sufficiently high to leave a clearance distance y to permit the tower man to unlatch and stack the raised stand. This condition is indicated in Fig. 13, with the further action of the No. 2 block 38, raising the pipe and the No. 1 traveling block 37, being lowered to the floor. Then after slips are inserted to support the pipe at the rotary, the top stand is unscrewed, the crown blocks unlocked and shifted over to the right as in Fig. 14, whereupon the second stand 49a, is racked on the right hand platform 50a, the lowered traveling block 37, connected with the string and the third stand hoisted out of the hole as in Fig. 15. This stand is racked to the left and the succeeding stand will be racked to the right.

Thus in coming out of the hole, the stands are stacked left and right in alteration by the traveling block shifted in that direction and the empty block is returned while the loaded block is in service.

Figures 17, 19, 20:
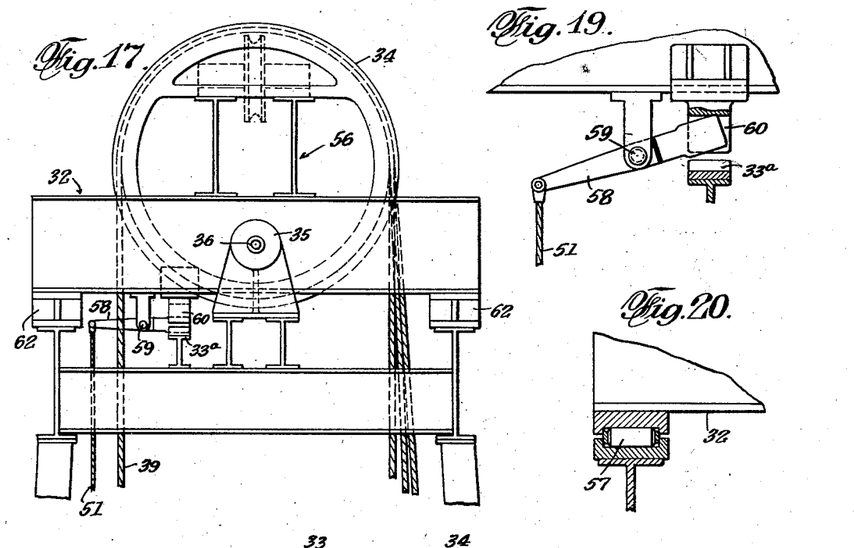
Fig. 17 is a broken end elevation of the water table carrying the double crown blocks for the two traveling blocks.
Fig. 19 is a broken part sectional detail of the mechanism for locking the crown blocks centered over the well.
Fig. 20 is a broken sectional detail of the roller bearing mounting for the shiftable crown block carriage.
Figures 18, 21:
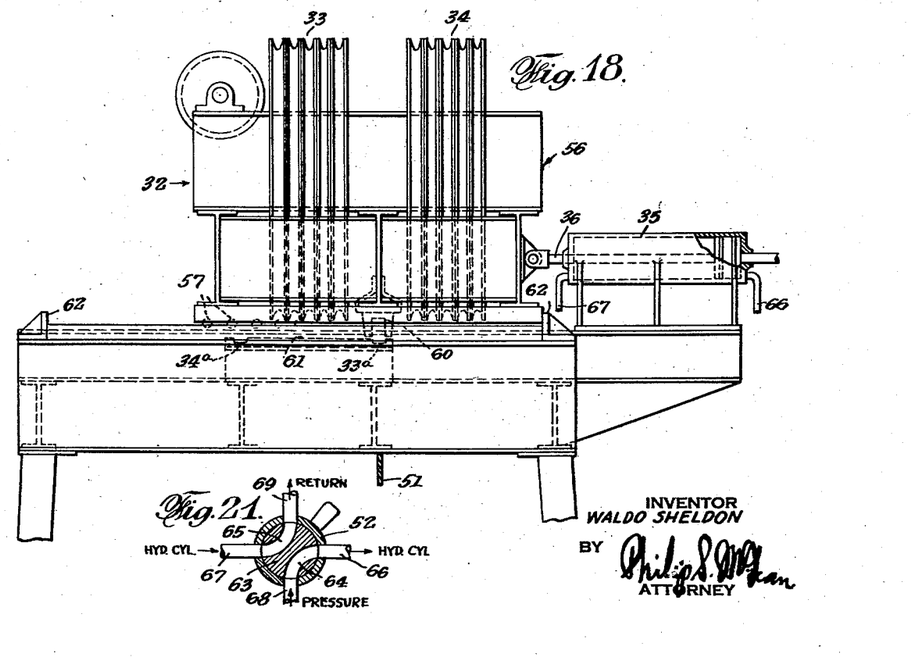
Fig. 18 is a broken part sectional front elevation showing the twin crown blocks and mechanism for shifting them alternately over the well center.
Fig. 21 is a broken sectional detail of the control valve for the hydraulic shifting cylinder.

In Figs. 17 and 18 the crown blocks 33, 34, are shown as two sets of closely adjoining sheaves rotatably mounted on a common internal supporting structure 56, extending through and supporting the two sets of sheaves in closely spaced relation. This close side-by-side relation of the sheaves of each set and the close spacing of the two sets keeps the shifting movement necessary for lining up each crown block over the well center down to a minimum. To reduce friction and enable a small size motor to accomplish the shifting, the crown block carriage 32, may be mounted on roller or other anti-friction bearings such as indicated at 57.

The means for locking one or the other crown block lined up over the well is shown as a simple locking lever 58, Figs. 17, 19, pivoted on the carriage at 59, Fig. 19, and adapted to drop at its inner end from a guide 60, into either one or the other of stationary positioning notches 33a, 34a, for the two crown blocks 33, 34, Fig. 18. This lever can be tripped by a simple pull cord 51, and once tripped, it need not be held since it will ride along the track 61, between the notches and automatically drop into the receiving notch at the end of the carriage travel. Heavy stop abutments are indicated at 62, Fig. 18, to positively limit the extent of carriage movement.

The control valve 52, may be of the simple oscillating type, including a valve element 63, Fig. 21, which can be turned in opposite directions to bring the reversely angled passages 64, 65, into register with lines 66, 67, leading to opposite ends of the power cylinder 35, and with the pressure and return lines 68, 69. In the position shown in Fig. 21, the hydraulic or other power fluid is being admitted from pressure line 68, and passage 64, through line 66, to the right hand end of the power cylinder and fluid from the opposite end of the cylinder is being relieved through line 67, and passage 65, to the return or exhaust line 69, thus to effect shift of the crown block assembly to the left. Turning of the valve element to a position at right angles to this will accomplish shifting of the crown block assembly in the opposite direction.

The design of the draw works may vary considerably. One of the simplest forms is that shown in Fig. 3 and illustrated more in detail in Fig. 22, embodying a single drum 42, and a single cable having a sufficient number of wraps 41, about the drum to afford the necessary friction grip of the drum on the cable. This single drum can be made of large diameter, since there is only a single layer of convolutions and this large diameter drum in addition to providing all necessary frictional grip, preserves the cable by reason of the easy bending arc. This drum is driven in opposite directions by suitable gearing partly indicated at 70, 71, under control of clutches 72, 73, or other means, and brakes, which latter may be of the hydraulic type as indicated at 74, 75.

Figures 22, 23:
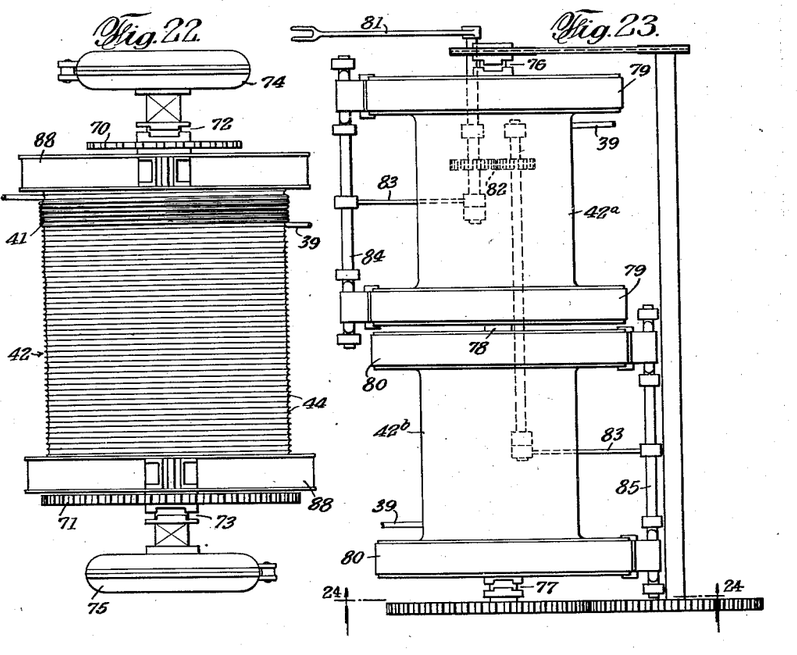
Fig. 22 is a broken plan of a draw works drum with a single cable having turns wrapped about the same as in Fig. 3.
Fig. 23 is a plan of another form of draw works with drums for two oppositely acting cables.
Figure 24:
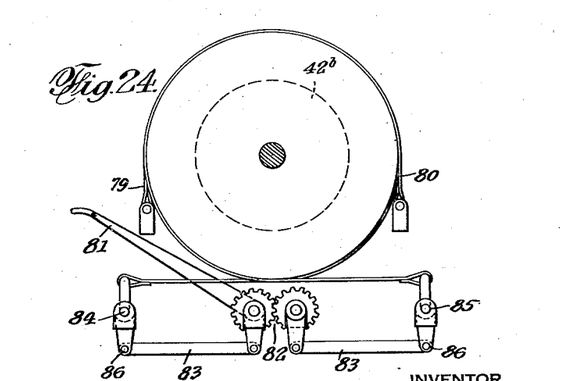
Fig. 24 is a sectional view as on line 24—24 of Fig. 23.

In Figs. 23 and 24, a form of double draw works is illustrated comprising separate coaxial drums 42a and 42b, for carrying the lines to the two crown blocks and which can be coupled by clutches 76, 77, on the same shaft 78, so as to rotate as one when turning in one direction or the other. The provision of separate clutches also enables one drum to be controlled independently of the other, as for the purpose of regulating the relative positions of the two traveling blocks. Oppositely acting hand brakes for the two drums are indicated at 79, 80, controlled by a single brake lever 81, with gearing at 82, and linkage at 83, for simultaneously rocking the brake band shafts 84, 85, in opposite directions. The links 83, may be made readily detachable as by removal of pins 86, Fig. 24, to enable, when desired, control of the brakes for one drum independently of the other drum.

Figure 25:
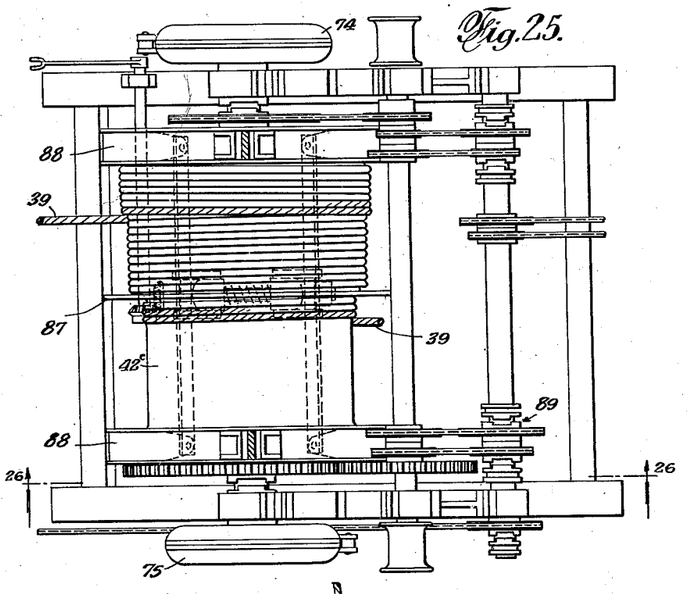
Fig. 25 is a broken plan view of a form of draw works having cables wrapping in opposite directions on the same drum.
Figure 26:
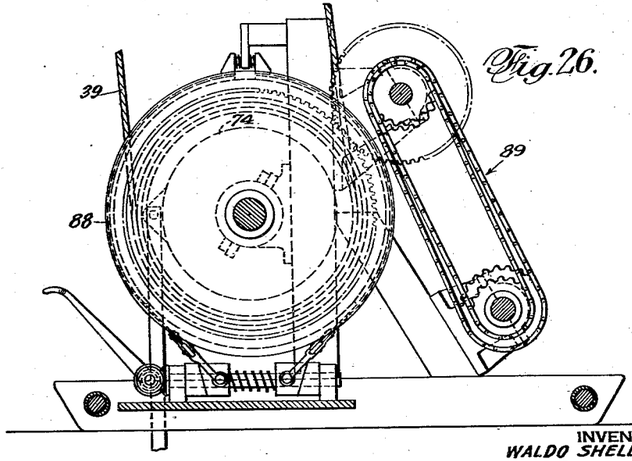
Fig. 26 is a vertical sectional view as on line 26—26 of Fig. 25.

A development of the single drum draw works is illustrated in Figs. 25 and 26, differing from the first form in that a separating flange 87, for the oppositely running lines is provided at the intermediate portion of the drum 42c. The holding brakes 88, for this drum as in the first instance, are double acting to hold the drum against rotation in either direction. The clutches and gearing for controlling and driving the drum in either direction may follow conventional practice as indicated generally at 89, modified as here required to provide the necessary power and speed for movement of the traveling blocks in both directions.

Figures 27, 28, 29:
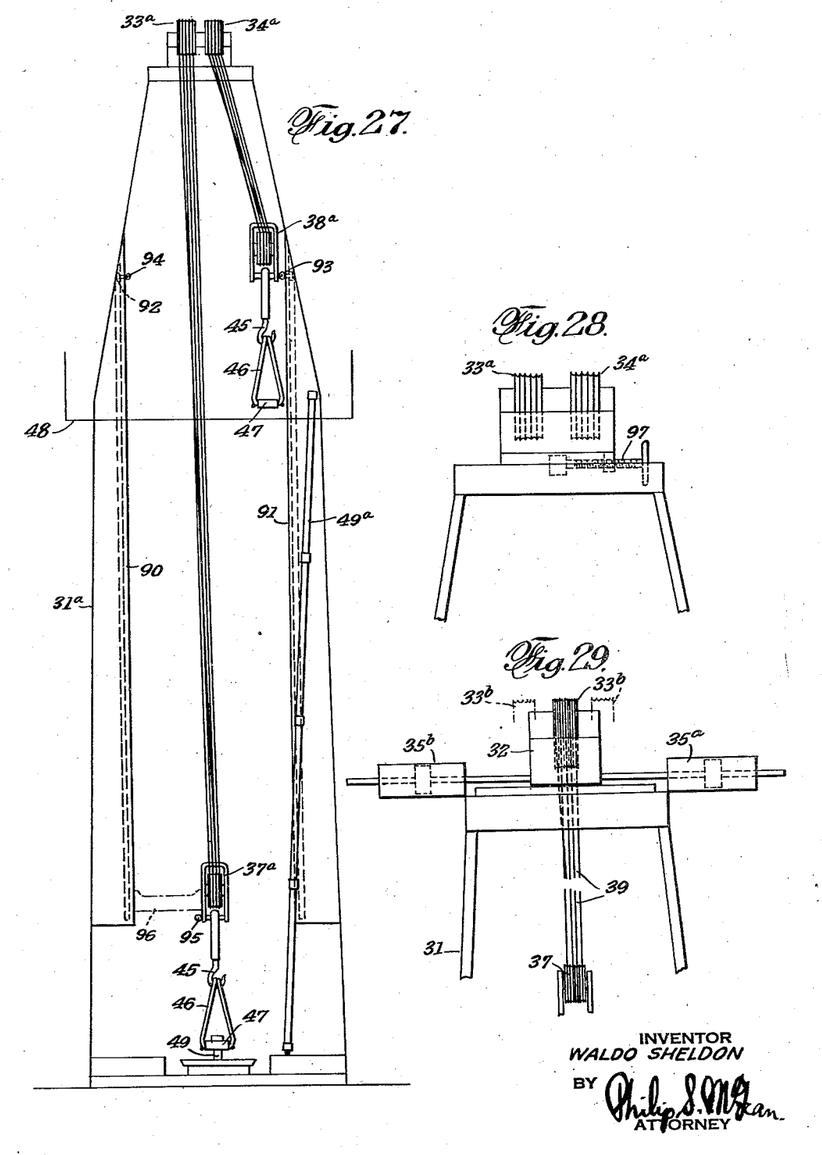
Fig. 27 is a diagrammatic illustration of a modification in which the traveling blocks are directed in their movements by guide rails.
Fig. 28 is a broken detail illustrating a form of adjusting means which may be used in Fig. 27, for centering the block which is in service.
Fig. 29 is a diagrammatic view of a further modification.

Fig. 27 illustrates a modification of the invention, in which clearance for movement of the traveling blocks up and down past one another is accomplished by linking one or both blocks to stationary guides provided at the sides of the derrick. These may be in the nature of elevator guides, indicated at 90, 91, over which slide the shoes 92, 93, which can be coupled to the blocks as by pins inserted through companion coupling brackets 94, 95, on the shoes and blocks respectively. The two crown blocks in this case may be stationary and the coupling of the idle or returning traveling block to the elevator guide be relied upon to hold that block away from the other one. If desired, also the loaded block may be held by the guide directly in line over the well as by a special centering bracket indicated in broken lines at 96, detachably connectible with the block. If necessary or desirable, also the double crown block structure may be bodily shifted to approximately or to actually center the load carrying traveling block as by means of screw mechanism such as indicated at 97, Fig. 28.

The guiding construction for the traveling blocks is particularly suited to derricks of the type indicated at 31a, Fig. 27, in which the sides of the derrick are substantially parallel for most of the height, tapering only at the upper portion at or above the forble board 48, and which construction provides sufficient vertical rise for the guides.

Instead of being mounted on the same carriage, the two crown block units may be mounted on separate supports and be shifted by separate power cylinders or other forms of motors.

Fig. 29 illustrates a modification in which the crown block assembly consists of a single crown block 33b, shiftable by the power cylinder 35a, 35b, from a center position to positions for stacking pipe or for removing pipe from stacks at opposite sides of the rotary. Instead of stacking the pipe to opposite sides, all pipe may be stacked at one side, in which event, the crown block assembly would have movement from the central position to position at one side of the center.

What is claimed is:

1. In well drilling apparatus, the combination of two crown block units, means mounting the same for reverse shifting movements laterally over and away from centered position over a well head, two traveling blocks, cables suspending said traveling blocks from said crown block units, draw works for operating said cables to lower one traveling block while raising the other, reversible power means for effecting lateral shift of said crown block units and the traveling blocks suspended therefrom to center one or the other of said traveling blocks over a well head and means for locating and releasably locking one or the other crown block unit centered over the well head.

2. Apparatus for racking the stands of pipe employed in deep oil well drilling operations, comprising in combination with a large size heavy duty deep oil well drilling derrick, a carriage mounted for lateral traveling movement on the top of said derrick, crown block sheaves journalled on said carriage, a traveling block, cable suspending said traveling block from said crown block sheaves, an elevator carried by said traveling block for attachment with the stands of pipe to be racked, reversible power means mounted on said derrick and connected to positively shift said crown block carriage a distance sufficient to transport an elevator suspended from the traveling block from a position over the well to a racking position at one side of the well and vice versa, means for controlling said power means to effect lateral travel of said crown block carriage in opposite directions for transporting stands of pipe suspended by the elevator between the well center and rack positions, substantially as described, means for automatically stopping and locking said carriage in position with said crown block lined up over the well center and means for effecting the release of said locking means preliminary to the lateral shifting of said crown block carriage.

3. Apparatus for racking the stands of pipe employed in deep oil well drilling operations, comprising in combination with a large size heavy duty deep oil well drilling derrick, a carriage mounted for lateral traveling movement on the top of said derrick, crown block sheaves journaled on said carriage, a traveling block, cable suspending said traveling block from said crown block sheaves, an elevator carried by said traveling block for attachment with the stands of pipe to be racked, reversible power means mounted on said derrick and connected to positively shift said crown block carriage a distance sufficient to transport an elevator suspended from the traveling block from a position over the well to a racking position at one side of the well and vice versa and means for controlling said power means to effect lateral travel of said crown block carriage in opposite directions for transporting stands of pipe suspended by the elevator between the well center and rack positions, substantially as described, said crown block sheaves comprising two complete crown block assemblies in the side-by-side relation both mounted on the same laterally travelling carriage and there being a separate traveling block and elevator suspended from each crown block assembly and arranged to travel in reverse directions and said power means being effective to shift the crown block carriage for racking stands of pipe suspended by the respective traveling blocks alternately to rack positions at opposite sides of the well center, means for automatically locking said crown block carriage with said crown block assemblies alternately over the well center and in racking position at the opposite sides of the well center and means for effecting the release of such locking means prior to the opposite shifting movements of said crown block carriage.

4. Apparatus for racking the stands of pipe used in deep oil well drilling operations, comprising in combination with a large size heavy duty deep oil well drilling derrick, two separate crown blocks guided for back and forth lateral travel on the top of said derrick, two separate traveling blocks, cable lines suspending said traveling blocks from said crown blocks and arranged to effect hoisting of the traveling block suspended from one crown block while the traveling block suspended from the other crown block is being lowered, power means connected with said laterally shiftable crown blocks and operable to effect movement of the same sufficient to carry the traveling blocks suspended therefrom from a position over the well center to positions at opposite sides of said well center, control means for effecting such operation of said power means and releasible locking means for securing either crown block in centered position over the well and including locking elements free to permit shifting movements of said crown blocks but automatically engageable to lock the same at the ends of such shifting movements.

5. In combination, a heavy duty large size deep oil well drilling derrick, separate crown blocks mounted for lateral back and forth travel on said derrick, a traveling block for each crown block, large diameter drum and a single cable for both traveling blocks, said cable being wrapped in a single layer about said large diameter drum and extending in reversely running lines from opposite sides of said drum over the two different crown blocks to the respective traveling blocks, said large diameter drum being elongated to permit said single layer wrap of cable to travel longitudinally sufficiently for the complete up and down travel of the respective traveling blocks, means for effecting braking control of said single drum in rotation of the same in opposite directions and means for effecting lateral back and forth movement of said crown blocks on said derrick to accomplish shifting of said traveling blocks between the well center and racking positions at opposite sides of the same.

6. In combination, a heavy duty large size deep oil well drilling derrick, a heavy carriage mounted for transverse travel across the top of the derrick, antifriction bearings for said carriage, heavy stops for positively limiting the movements of said carriage, reversible power means for positively shifting said carriage in opposite directions, two sets of large diameter annular crown block sheaves disposed in closely adjoining side-by-side relation on said carriage, internal supporting structure extending through said annular sheaves and common to both sets of crown block sheaves and traveling blocks suspended from the respective crown block assemblies.

WALDO SHELDON.